United States Patent [19]

Maurel et al.

[11] 4,451,439
[45] May 29, 1984

[54] PROCESS FOR THE PURIFICATION OF SOLUTIONS CONTAINING A SODIUM OR POTASSIUM CARBONATE, SULPHATE, AND POSSIBLY HYDROXIDE, AND AT LEAST ONE OF THE METALS VANADIUM, URANIUM AND MOLYBDENUM

[75] Inventors: Pierre Maurel, Aix-en-Provence; Bernard Bosca, Gardanne; Francois Nicolas, Aix-en-Provence, all of France

[73] Assignee: Pechiney, Lyon, France

[21] Appl. No.: 324,060

[22] Filed: Nov. 23, 1981

Related U.S. Application Data

[63] Continuation of Ser. No. 946,025, Sep. 26, 1978, abandoned.

[30] Foreign Application Priority Data

Sep. 30, 1977 [FR] France ................. 77 30176
Aug. 18, 1978 [FR] France ................. 78 24843
Aug. 18, 1978 [FR] France ................. 78 24844

[51] Int. Cl.$^3$ ............... C01G 39/06; C01F 11/18; C01D 5/00
[52] U.S. Cl. ........................ 423/55; 423/11; 423/15; 423/17; 423/1; 423/65; 423/165; 423/199; 423/206 R
[58] Field of Search ............ 423/11, 15, 17, 55, 423/65, 165, 199

[56] References Cited

U.S. PATENT DOCUMENTS

| | | | |
|---|---|---|---|
| 2,813,003 | 11/1957 | Thunaes et al. | 423/17 |
| 2,815,263 | 12/1957 | Eldredge | 423/17 |
| 2,949,339 | 8/1960 | Marvin | 423/17 |
| 2,982,602 | 5/1961 | Sherk et al. | 423/17 |
| 3,112,275 | 11/1963 | Pollock et al. | 423/11 |
| 3,130,460 | 4/1964 | Martin | 423/17 |
| 3,227,515 | 1/1966 | Reusser | 423/17 |
| 3,288,569 | 11/1966 | Henrickson et al. | 423/17 |
| 3,306,714 | 2/1967 | Goren | 423/11 |
| 4,024,216 | 5/1977 | Finch et al. | 423/17 |

Primary Examiner—Herbert T. Carter
Attorney, Agent, or Firm—McDougal, Hersh & Scott

[57] ABSTRACT

A process for the purification of solutions containing sodium or potassium carbonate, sulphate, hydroxide or hydrogen carbonate, and mainly at least one of the metals belonging to the group formed by vanadium, uranium or molybdenum, in the form of sodium or potassium salts, and inorganic and/or organic impurities, wherein the above-mentioned solutions are completely or partially caustified by the addition of an adequate amount of lime, whereby a first precipitate essentially containing calcium carbonate is separated, and the separated liquor is concentrated by evaporation until the hydroxide content is at most equal to 50%, to cause the production of a second precipitate which essentially comprises sodium or potassium sulphate, then, after separation thereof, a hydroxide-rich liquor is collected.

This process is more particularly adapted for treatments of liquors resulting from the alkaline attach of vanadiferous and uraniferous ores.

18 Claims, 5 Drawing Figures

PROCESS FOR THE PURIFICATION OF SOLUTIONS CONTAINING A SODIUM OR POTASSIUM CARBONATE, SULPHATE, AND POSSIBLY HYDROXIDE, AND AT LEAST ONE OF THE METALS VANADIUM, URANIUM AND MOLYBDENUM

This is a continuation of application Ser. No. 946,025, filed Sept. 26, 1978, and now abandoned.

The present invention concerns a process for the purification of solutions containing a carbonate, sulphate, hydroxide or hydrogen carbonate of one of the alkali metals sodium or potassium, and mainly one at least of the metals belonging to the group formed by vanadium, uranium and molybdenum, in the form of sodium or potassium salts, and, finally, inorganic and/or organic impurities.

It is already known that ores such as certain uraniferous and also vanadiferous ores are subjected to attack by means of sodium hydroxide in solution or by sodium carbonate and bicarbonate in solution, according to the type of ore being treated; the attack solutions originating partly from a recycling operation and partly from an addition of reagent.

Thus, in the case of a uraniferous ore for example, the ore is attacked by a sodium carbonate and/or bicarbonate liquor. The solubilised uranium which is present in the liquor after the attack operation is usually precipitated in the form of a sodium uranate which may be converted by the following known means: either into an ammonium uranate which is crystallised by a sulphur-ammonium transposition, which comprises treating the sodium uranate with a solution of ammonium sulphate, or to a uranium peroxide by sulphuric redissolution and precipitation of the peroxide by the introduction of hydrogen peroxide.

At the same time that the main metal dissolves, other elements such as for example sulphur, various other metals and organic materials contained in the ore, dissolve as sodium salts.

Since then, another cycle for attacking uraniferous ores has been described, which, according to a process for the hot oxidising attack of said ores, comprises treating the ores with an aqueous potassium bicarbonate and carbonate solution in the presence of free oxygen which is blown under pressure into the reaction medium.

Depending on the initial constitution of the ore and depending on the amount and the nature of the additional agents which are introduced to facilitate the attack operation, this results in the solution after attack being enriched with sodium or potassium carbonate, sulphate, hydroxide or hydrogen carbonate.

Thus, the liquor after attack contains both the desired metal and impurities originating from the recycled liquors and impurities which are solubilised in the attack operation. Now, it is well known that, in attack processes which involve recycling of the unconsumed reagents, it is absolutely essential to limit the amounts of impurities present in the solutions.

Indeed, impurities usually have a detrimental influence on the qualities of the main product which is to be produced, and the presence of impurities, at excessively high levels of concentration, may be troublesome in the attack operation and/or may also result in untimely precipitation phenomena at various points in the production circuits.

In the specialist literature relating to this art, it is often stated that removal of the impurities present in the liquors in circulation is effected at the same time as the sterile materials, in the form of an impregnation liquor, as a result of insufficient washing.

Dumping sterile materials which are still highly alkaline, or the above-mentioned liquors, in the natural environment, is becoming increasingly prohibited by national legislation, because of the irrevocable damage which such effluents can cause to the environment.

Now, if it appears desirable to provide for better washing of the sterile materials, in order to improve the recovery of the reagents and the product which is to be put to use, the amount of impurities present in the circuit increases simultaneously.

Consequently, it is becoming necessary to use a process which makes it possible to extract the impurities in a sufficient amount, from the liquors to be treated, so that the amounts of impurities in such liquors cannot give rise to the above-mentioned disadvantages.

The applicants, continuing their research, have perfected a process for the treatment of liquid alkaline effluents, which provides a real solution to the many difficulties which have been encountered hitherto by the man in the art.

BRIEF DESCRIPTION OF THE INVENTION

The novel process for the purification of solutions containing a carbonate, sulphate, hydroxide or hydrogen carbonate of one of the the alkali metals, sodium or potassium, and mainly at least one of the metals belonging to the group formed by vanadium, uranium and molybdenum, in the form of sodium or potassium salts, and inorganic and/or organic impurities, comprises treating said solutions at a temperature which at most is equal to the boiling temperature, with an amount of lime which is from 0.1 to 20 times the stoichiometric amount required for converting the carbonates present to hydroxide, without taking account of the amount of lime necessary for precipitating the insoluble metal compounds of calcium, then effecting separation and washing of a first precipitate which essentially contains calcium carbonate and a mixture of other organic and inorganic calcium salts, and a hydroxide-enriched liquor, concentrating by evaporation the mixture of said liquor and the washing liquor of said first precipitate until the hydroxide content is at most equal to 50%, to cause the formation of a second precipitate which essentially comprises sodium or potassium sulphate followed by, separating the crystals of said second precipitate from their hydroxide-rich mother liquor, and recovering said hydroxide-rich liquor.

In the solutions to be treated according to the invention, the concentrations of $M_2SO_4$, $M_2CO_3$, free MOH or $MHCO_3$ in the absence of MOH, in which M represents one of the alkali metals sodium or potassium, and of sodium or potassium compounds of at least one of the metals of the group formed by uranium, vanadium and molybdenum are not critical. Their relative proportions may vary within wide limits, without interfering with satisfactory performance of the process according to the invention.

Caustification of the solutions is generally effected by introducing an amount of lime which is at least equal to the stoichiometric amount necessary for the virtually total conversion of the carbonate and/or hydrogen carbonate present in the liquor, to hydroxide, in accordance with the reactions:

$$M_2CO_3 + Ca(OH)_2 \rightarrow CaCO_3 + 2MOH$$

or $MHCO_3 + Ca(OH)_2 \rightarrow CaCO_3 + MOH + H_2O$

When the solutions to be caustified contain metal salts which with the lime and under the operating conditions are liable to form an insoluble compound, the total amount of lime introduced is formed by the amount of lime which is effectively necessary for caustification of the carbonates and/or hydrogen carbonates in solution, and the amount of lime necessary for precipitating said metal elements in the form of insoluble calcium compounds. Consequently, and to simplify understanding of the subject of the present invention, we shall mention only the amount of lime which is effectively necessary for solely caustifying the sodium or potassium carbonates.

The corresponding caustification treatment temperature is at most equal to the boiling temperature of the liquor treated. It is therefore at from 20° C. to 100° C. but preferably from 50° C. to 97° C.; in most cases, precipitation and filtration of the residue obtained are improved when the caustification temperature is close to the boiling temperature.

The first precipitate essentially comprises calcium carbonate and the excess of lime and, in a minor amount, organic and inorganic calcium salts.

Separation of the first precipitate from the alkaline mother liquor is effected by a known means such as filtration, centrifuging, decantation, etc.

The alkaline mother liquor is then subjected to concentration by evaporation until reaching a hydroxide concentration of at most 50% and such that the residual amount of sulphate in the liquor after evaporation is controlled to the desired value. Indeed, in carrying out numerous verification operations, the applicants have found that the residual sodium or potassium sulphate content rapidly fell for rising concentrations of sodium or potassium hydroxide, up to about 25%, and, above that limit, fell more slowly. A second precipitate is then collected, which essentially comprises sodium or potassium sulphate, which is separated from the hydroxide-rich mother liquor by a known means, and then washed with water or with a sodium or potassium sulphate-saturated aqueous solution, the washing liquor being recycled to the concentration operation.

As the hydroxide-rich mother liquor recovered still contains impurities, it may be desirable to carry out a supplementary treatment on said liquor for extracting therefrom the elements such as molybdenum, organic materials and other substances which are troublesome in regard to its subsequent use.

The molybdenum may be removed by means of one or other of the following alternative forms of operation, by precipitation of a sulphur compound of this metal.

In a first alternative form, the treatment for removal of the molybdenum comprises acidifying the hydroxide-rich mother liquor recovered, and introducing sulphide ions in excess relative to the stoichiometric amount required.

In a second alternative form, the treatment for removing the molybdenum is not applied to the hydroxide-rich mother liquor which is collected after caustification and removal of the sulphate ions, but to the starting solutions which are to be caustified and which contain the sodium or potassium carbonate, sulphate, hydroxide or hydrogen carbonate, and primarily one at least of the metals belonging to the group formed by vanadium, uranium and molybdenum, in the form of sodium or potassium salts and inorganic acid and/or organic impurities. In this form of operation, the molybdenum removal treatment comprises acidifying an aliquot part of the solutions which are to be caustified, then introducing sulphide ions in excess relative to the stoichiometric amount required.

The sulphide ions introduced to provide for removal of the molybdenum by precipitation of a sulphur compound of this metal are generally alkaline sulphides such as sulphides of sodium, potassium or ammonium, or hydrogen sulfide.

According to one or other of the alternative forms, the operation of introducing the sulphide ions into the liquor to be treated may be effected before, simultaneously with or after acidification.

In order to provide for removal of the organic materials, the hydroxide-rich mother liquor is treated in known manner:

either by a barium compound, by profiting from the sparing solubility of the barium organates in the alkaline medium. The barium compound is introduced in an amount which is at least equal to the stoichiometric amount required for permitting precipitation and removal by separation of the organo metallic compounds;

or by sodium or potassium dioxide causing 'in situ' degradation of the organic materials;

or by hydrogen peroxide, causing the same degradation;

or finally by passing said liquor over activated carbon having the well known property of retaining the organic elements which are present in the mother liquor being treated.

Likewise, the hydroxide-rich mother liquor which results from the operations of caustification and removal of the sulphate ions may be subjected to a conversion treatment before being used in the production cycle such as the mineral attack process. Thus, the hydroxide-rich mother liquor may be partially or totally carbonated by being brought into contact with carbon dioxide, using known means, for example by blowing in a large excess of carbon dioxide gas. Depending on the conditions of this operation, it is possible to produce a sodium or potassium carbonate precipitate, which can be subsequently separated.

According to the characteristics of the alkaline mother liquor, upon discharge from the evaporation step, and the uses to which the purified liquor is to be put, it is possible to use either one or the other of the treatments for removing molybdenum and the organic materials or for carbonation, or for such treatments to be partially or totally combined.

In accordance with an additional arrangement of the process of the invention, it is possible that, in the treatment of the solutions by means of lime, there may be incomplete caustification of the sodium or potassium carbonate, in spite of the introduction of a large excess of lime, or else it may be found desirable to perform controlled caustification of the carbonate, by introducing a sub-stoichiometric amount of lime. In that case, in the course of the operation of concentrating the alkaline mother liquor by evaporation, there appears a precipitate which may comprise:

when the caustification is preformed with sodium carbonate, either the double salt $2Na_2SO_4.Na_2CO_3$, or a mixture of sodium carbonate and this double salt, or, finally, a mixture of sodium sulphate and the double salt, the production of one or other of the three possible precipitates essentially depending on the composition of the alkaline liquor after caustification, and the evaporation rate employed;

when the caustification is performed with potassium carbonate, a mixture of potassium carbonate and potassium sulphate, the composition of this mixture essentially depending on the composition of the alkaline liquor after the caustification operation and the evaporation rate employed.

In the case of such incomplete caustification, the hydroxide-rich mother liquor which is produced by liquid-solid separation after evaporation still contains impurities which should desirably be removed, the most troublesome of such impurities being the molybdenum and the organic materials which are removed by one or other of the supplementary treatments mentioned above.

Likewise, carbonation of the hydroxide-rich mother liquor may be effected as already described above.

The invention will be better understood from the description of the accompanying drawings.

DETAILED DESCRIPTION OF THE INVENTION

Figure 1:
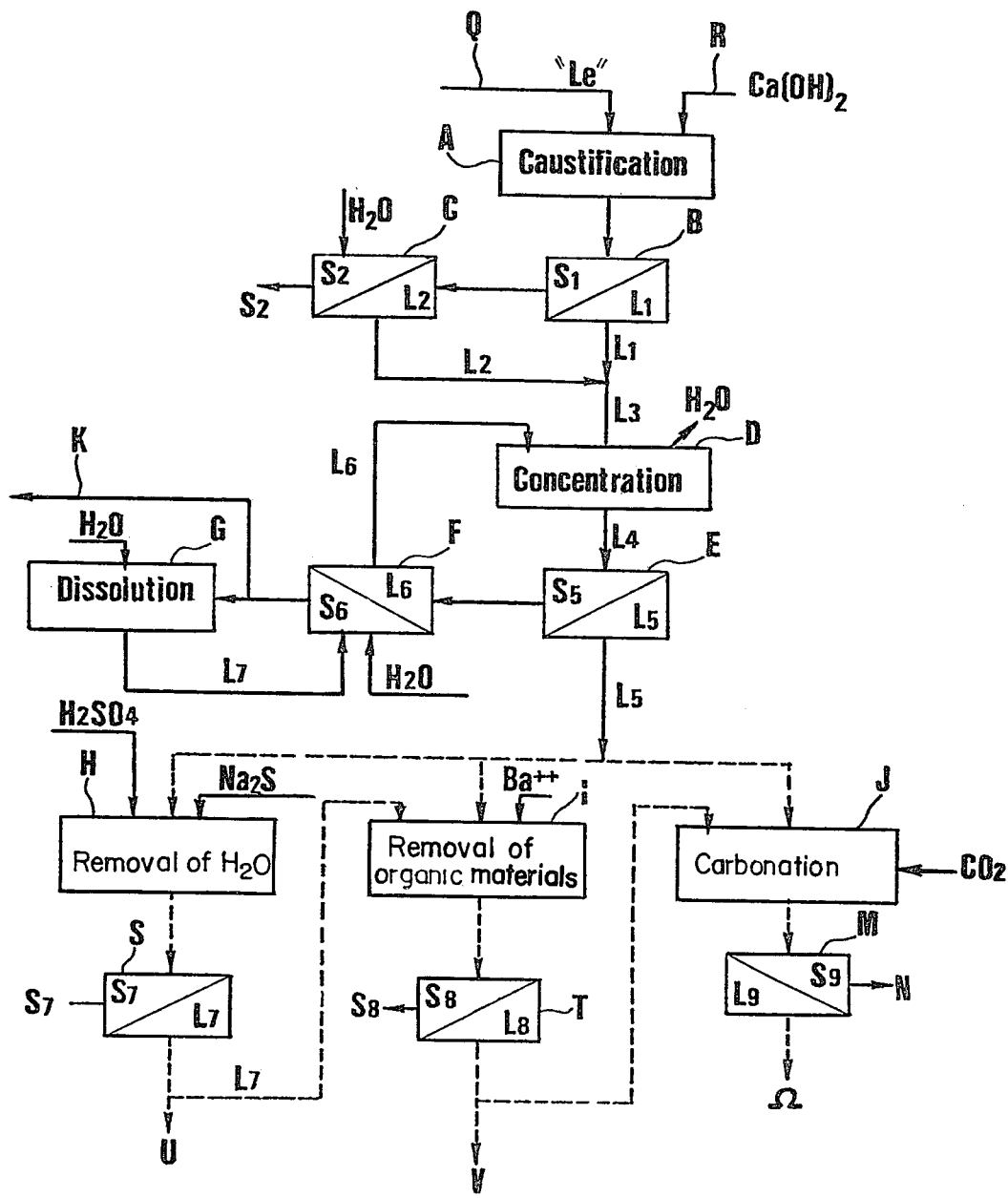
FIG. 1 is a diagrammatic view of the process according to the invention, showing in solid lines the circuit used when it is desired to remove only sodium or potassium carbonates and sodium or potassium sulphates, and, in broken lines, the circuits used for performing on the hydroxide-rich mother liquor which is produced in the caustification operation, either an additional operation for purification in respect of molybdenum and/or organic materials, or a carbonation operation, by performing the supplementary treatment mentioned above intended for this purpose, or by effecting a complete treatment by the successive performance of the above-described supplementary treatments.

The alkaline solutions 'Le' to be treated and the lime required are introduced into A by way of Q and R. The slurry produced after treatment by means of the lime is introduced into the reactor B for effecting separation of a cake $S_1$ and a liquor $L_1$ containing certain solubilised impurities. The mother liquors of the cake $S_1$ are extracted at C by means of an amount of water which is introduced. The mother liquors $L_2$ which are thus extracted are mixed with the liquor $L_1$, forming the liquor $L_3$. The resulting cake $S_2$ extracted from C essentially comprises calcium carbonate.

The liquor $L_3$ formed by the mixture of liquors $L_1$ and $L_2$ is passed into D for effecting concentration in free soda by evaporating water, causing precipitation of a sodium sulphate.

The slurry $L_4$ issuing from the concentration step is introduced into E where separation of a liquor $L_5$ and a cake $S_5$ is effected.

The cake $S_5$ which essentially comprises sodium sulphate is entrained into F where it is subjected to a rinsing operation, either by means of water or by means of a sodium sulphate-saturated solution, with recycling of the rinsing liquor $L_6$ to D.

The cake $S_6$, which is impregnated with the rinsing liquor, may be taken out of the treatment cycle by K, or it may be partly introduced with water into G where the rinsing solution $L_7$ to be used in F is prepared.

The hydroxide-rich liquor $L_5$ issuing from E may contain in solution impurities such as molybdenum, and various organic and inorganic salts which it may be desirable to remove.

If the molybdenum is to be removed from the liquor $L_5$, the liquor is introduced into H with the required amount of for example $Na_2S$ or $K_2S$. The resulting slurry is introduced into S where there is separation of the solid phase formed by a molybdenum sulphur compound which is removed and the phase $L_7$ which may be collected in U or else recycled to another stage of the process such as I or J.

If the organic materials present are to be removed from the liquor $L_5$, the liquor is introduced into I with for example a sufficient amount of a barium compound, causing precipitation of the barium organates. The slurry issuing from I is then introduced into T where there is effected separation of a cake $S_8$ and a liquor $L_8$ which can be collected in V, or else recycled to another stage of the process such as for example J.

Likewise, if it is desirable to carbonate the hydroxide-rich liquor $L_5$, the liquor is introduced into J to undergo carbonation therein, by blowing in $CO_2$. The resulting slurry can be used in the form in which it is produced or it may be treated in M to separate the cake $S_9$ formed by sodium carbonate and a carbonated liquor $L_9$ which can be collected in $\Omega$ or recycled to J for producing a solid sodium carbonate.

However, it will be evident that the hydroxide-rich liquor $L_5$ may be successively subjected to two of the three treatments mentioned above, depending on the impurities which are to be removed and depending on the uses for which the liquor is intended after purification. For example, it is possible for the operations of removing molybdenum and the organic materials to be combined in series; in this case, an aliquot part of the whole of the liquor $L_7$ which results from the operation of removing molybdenum at S is introduced into I and then T in order there to undergo an operation of removing organic materials. Conversely, the operation of removing organic materials may precede the operation of removing molybdenum. It is also possible successively to effect removal of the organic materials and carbonation of the liquor; in this case an aliquot part or the whole of the liquor $L_8$ resulting from T in which the operation of removing the organic materials is effected, is introduced into J in order there to undergo the desired carbonation step.

The process according to the invention is noteworthy by virtue of its flexibility and adaptability. That is very important because, if sodium or potassium sulphate is generally present in the solutions to be purified, and if moreover sodium or potassium carbonate are similarly generally present, the other components present may vary qualitatively and quantitatively according to the origin of the solutions to be treated. Thus, the process is found to be particularly attractive from an environmental point of view, as it does not involve the dumping of liquid waste matter in the environment.

Moreover, this process enjoys other advantages of which we may first mention the possibility of recycling a concentrated sodium or potassium hydroxide solution, or a sodium or potassium carbonate solution, possibly a suspension of said salt, or even sodium or potassium carbonate in the solid state, although there is also the possibility of being able to control as required the amount of sodium or potassium sulphate which is recycled, as well as the amounts of impurities (molybdenum, organic materials, vanadium . . . ).

The advantages of the process according to the invention will be much better appreciated by virtue of the examples which are given by way of illustration.

In all the examples, the amount of organic materials present in the liquors is expressed in respect of the mass of oxygen consumed in accordance with an analytical method derived from the conventional method of determining the B.O.D. This method comprises leaving a sample of the liquor whose organic material content is to be determined, which has been suitably diluted and acidified, for a period of 4 hours, in contact with an N/100 potassium permanganate solution whose excess is determined in turn by a 25 g/l ammonium and iron sulphates solution.

EXAMPLE 1

Figure 2:
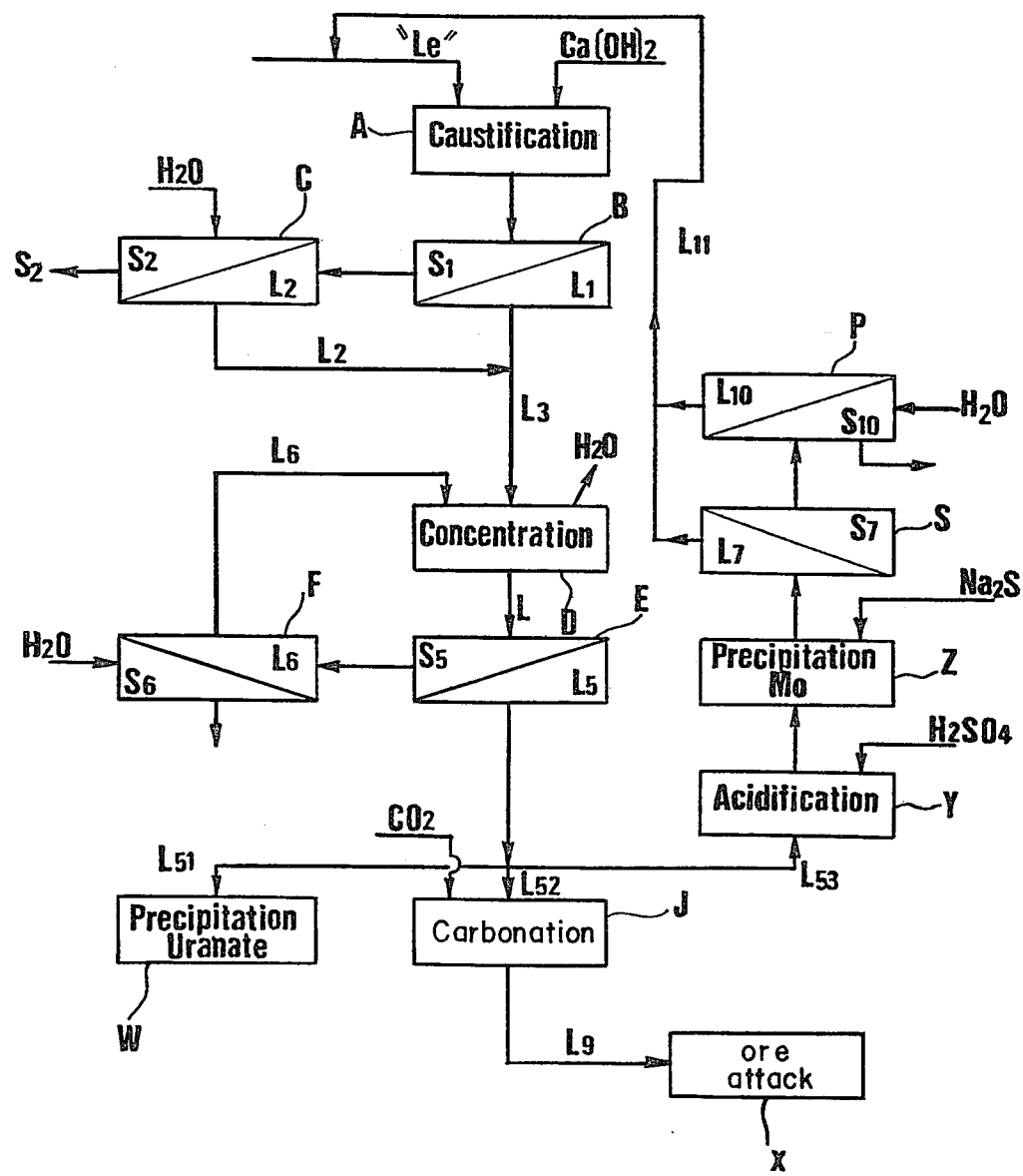
FIGS. 2, 3 and 4 are views illustrating the treatment according to the invention of solutions containing sodium or potassium carbonate, sulphate and hydroxide, and other organic and/or inorganic impurities.

(illustrated by FIG. 2)

A residual solution containing sodium carbonate, sulphate and hydroxide, which was drawn off at the end of a uraniferous attack cycle, after precipitation and separation of sodium uranate, was treated by the process of the invention. The composition of the solution 'Le' by weight was as follows:

| | |
|---|---|
| NaOH | 11.7 kg |
| $Na_2CO_3$ | 28.7 kg |
| $Na_2SO_4$ | 22.7 kg |
| Uranium | 0.025 kg |
| Molybdenum | 1.6 kg |
| $H_2O$ + organic materials and various | 1072.8 kg |
| including organic materials B.O.D. | 0.17 kg |

1,137.5 kg of this solution was introduced into A with 26.5 kg of lime representing an excess, for the purposes of effecting virtually total causitification of the carbonate present, by heating the solution to 95° C. and maintaining this temperature for a period of about 3 hours.

The resulting slurry was then decanted into B in which the operation of separating the solid phase $S_1$ and the liquid phase $L_1$ was effected.

The cake $S_1$ was then rinsed at C with 17.1 kg of water. The mother liquors which impregnated the cake $S_1$ were thus extracted and united with the liquor $L_1$ resulting from the separation operation in B.

The cake $S_2$ which had a weight of 46.7 kg was of the following composition, expressed in terms of weight:

| | |
|---|---|
| $CaCO_3$ | 26.9 kg |
| $CaSO_4$ | 4.0 kg |
| $Ca(OH)_2$ excess | 4.4 kg |
| Uranium | 0.004 kg |
| Impregnation $H_2O$, organic materials & various | 11.4 kg |
| including B.O.D. organic materials | 0.1 kg |

The liquor $L_3$ formed by the mixture of liquors $L_1$ and $L_2$ represented a weight of 1,134.3 kg and was of the following composition, by weight:

| | |
|---|---|
| NaOH | 35.7 kg |
| $Na_2SO_4$ | 18.5 kg |
| Uranium | 0.021 kg |
| Molybdenum | 1.6 kg |
| Water + organic materials and various | 1078.5 kg |
| including B.O.D. organic materials | 0.07 kg |

Liquor $L_3$ was passed into D where a concentration step was carried out by evaporation of 1,010.5 kg of water.

The slurry issuing from D was decanted into E where the operation of separating a cake $S_5$ and a liquor $L_5$ was effected.

The cake $S_5$ was then subjected to a rinsing operation in F with 12.5 kg of water, giving a cake $S_6$. The washing liquor $L_6$ was recycled to D in order to undergo concentration therein.

The cake $S_6$ represented a weight of 24.4 kg and had the following composition by weight:

| | |
|---|---|
| $Na_2SO_4$ | 18.2 kg |
| $H_2O$ (impregnation) | 6.2 kg |

The liquor $L_5$ resulting from the separation operation in E represented a weight of 111.9 kg and was of the following composition by weight:

| | |
|---|---|
| NaOH | 35.7 kg |
| $Na_2SO_4$ | 0.3 kg |
| Uranium | 0.021 kg |
| Molybdenum | 1.6 kg |
| $H_2O$ + organic materials and various | 74.3 kg |
| including B.O.D. organic materials | 0.07 kg |

Upon discharge from E, the liquor $L_5$ was divided into three portions $L_{51}$, $L_{52}$ and $L_{53}$.

The liquor $L_{51}$ representing a mass of 69.2 kg was directly recycled to W for precipitation of sodium uranate. The liquid $L_{52}$ representing a weight of 31.5 kg was introduced into J in order there to undergo carbonation by absorption of 5.53 kg of $CO_2$. The liquor $L_9$ resulting from the carbonation step in E was in actual fact a slurry having the following composition by weight:

| | |
|---|---|
| $Na_2CO_3$ | 13.3 kg |
| $Na_2SO_4$ | 0.08 kg |
| Molybdenum | 0.45 kg |
| Uranium | 0.006 kg |
| $H_2O$ + organic materials + various | 23.1 kg |
| including B.O.D. organic materials | 0.02 kg |

This slurry $L_9$ was then recycled to X for the attack on the uraniferous ore.

The liquor $L_{53}$ which represented a weight of 11.2 kg underwent an operation for removing molybdenum therefrom. For that purpose, the liquor was introduced into Y where it was subjected to acidification by the addition of 20.5 kg of a 22% $H_2SO_4$ solution, and then was disposed in Z where a treatment was performed to cause the precipitation of molybdenum sulphide, involving the addition of 14.3 kg of an aqueous solution containing 9.1% of $Na_2.S$, for a period of 1 hour at a temperature close to 80° C. The slurry issuing from Z was introduced into S in order to perform therein an operation of separating the solid phase $S_7$ and the liquid phase $L_7$.

The solid phase $L_7$ which essentially comprises molybdenum sulphide was rinsed in P with 0.5 kg of water, then the solid $S_{10}$ was extracted from P and the liquor $L_{10}$ was combined with the liquor $L_7$ to form the liquor $L_{11}$ which was returned before the caustification operation in A.

The liquor $L_{11}$ represented a weight of 45.0 kg and contained only 0.002 kg of molybdenum.

EXAMPLE 2

Figure 3:
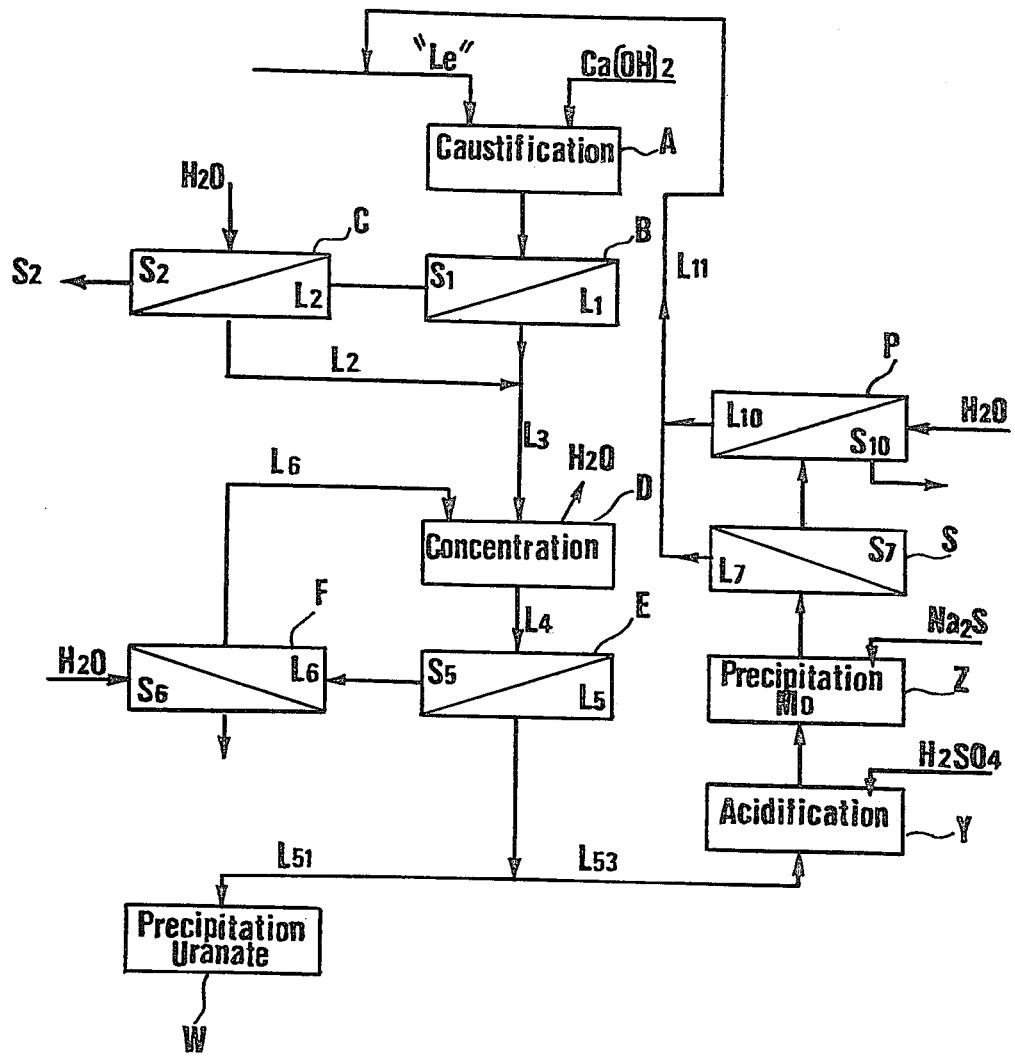

(illustrated in FIG. 3)

A residual sodium solution which was drawn off at the end of a uraniferous ore attack cycle, after the operations of precipitation and separation of the sodium uranate, was treated with the process according to the invention. The solution 'Le' was of the following composition, expressed by weight:

| | |
|---|---|
| NaOH | 11.7 kg |
| $Na_2CO_3$ | 45.0 kg |
| $Na_2SO_4$ | 28.0 kg |
| Uranium | 0.025 kg |
| Molybdenum | 1.1 kg |
| $H_2O$ + organic materials + various | 1158.7 kg |
| including organic materials | 0.17 kg |

1,244.5 kg of this solution was introduced into A with 11.4 kg of lime, which is very much less than the stoichiometric amount, for effecting partial caustification, for a period of time of 3 hours, at about 95° C.

The resulting slurry was then decanted into B where the operation of separating the solid phase $S_1$ and the liquid phase $L_1$ was performed.

The cake $S_1$ was then rinsed in C by means of 10.1 liters of water. The mother liquors which impregnated the cake $S_1$ were then extracted and combined with the liquor $L_1$ resulting from the separation operation in B, to form the liquor $L_3$.

After rinsing, the cake $S_2$ weighed 22.1 kg and had the following composition by weight:

| | |
|---|---|
| $CaCO_3$ | 15.3 kg |
| $H_2O$ + organic materials + various | 6.8 kg |
| including organic materials | 0.1 kg |

The liquor $L_3$ formed by the mixture of liquors $L_1$ and $L_2$ represented a total weight of 1,243.8 kg and was of the following composition by weight:

| | |
|---|---|
| NaOH | 24.0 kg |
| $Na_2CO_3$ | 28.7 kg |
| Uranium | 0.025 kg |
| $Na_2SO_4$ | 28.0 kg |
| Molybdenum | 1.1 kg |
| $H_2O$ + organic materials + various | 1162.0 kg |
| including organic materials | 0.07 kg |

This liquor was introduced into D in which concentration was effected by evaporation of 1,023.8 kg of water.

The slurry issuing from D was decanted into E in which it was separated into a cake $S_5$ and a liquor $L_5$.

The cake $S_5$ was rinsed in F with 15.6 kg of water and the washing liquor $L_6$ was recycled to D, in order to undergo concentration therein.

The cake $S_6$ produced by washing $S_5$ comprised 30.2 kg of a double salt having the following formula:
$2Na_2SO_4,Na_2CO_3$, impregnated with 10.4 kg of water.

The liquor $L_5$ originating from E represented a weight of 195 kg and was of the following composition expressed by weight:

| | |
|---|---|
| NaOH | 24.0 kg |
| $Na_2CO_3$ | 20.5 kg |
| $Na_2SO_4$ | 6.0 kg |
| Uranium | 0.025 kg |
| Molybdenum | 1.1 kg |
| Water + organic materials + various | 143.4 kg |
| including organic materials | 0.07 kg |

Upon issuing from E, the liquor $L_5$ was fractionated into liquors $L_{51}$ and $L_{53}$. The liquor $L_{51}$ representing a mass of 175.5 kg was recycled to the operation of precipitating sodium uranate.

The liquor $L_{53}$ representing a mass of 19.5 kg was intended to undergo an operation for removing molybdenum. This liquor was then introduced into Y where it was subjected to acidification by the introduction of 22.1 kg of 22% $H_2SO_4$ solution and was then placed in Z where a treatment was effected by the addition of 9.9 kg of 9.1% $Na_2S$ solution at a temperature of 80° C. and over a period of 1 hour, causing precipitation of molybdenum sulphide. The slurry issuing from Z was introduced into S where the acid phase $S_7$ and the liquid phase $L_7$ were separated.

The solid phase $S_7$ was rinsed in P with 0.5 kg of water, then the solid $S_{10}$ was extracted therefrom, together with the liquor $L_{10}$ which, combined with the liquor $L_7$, formed the liquor $L_{11}$ which was returned before the caustification step in A.

The liquor $L_{11}$ represented a weight of 51 kg, containing only 0.002 kg of molybdenum.

EXAMPLE 3

Figure 4:
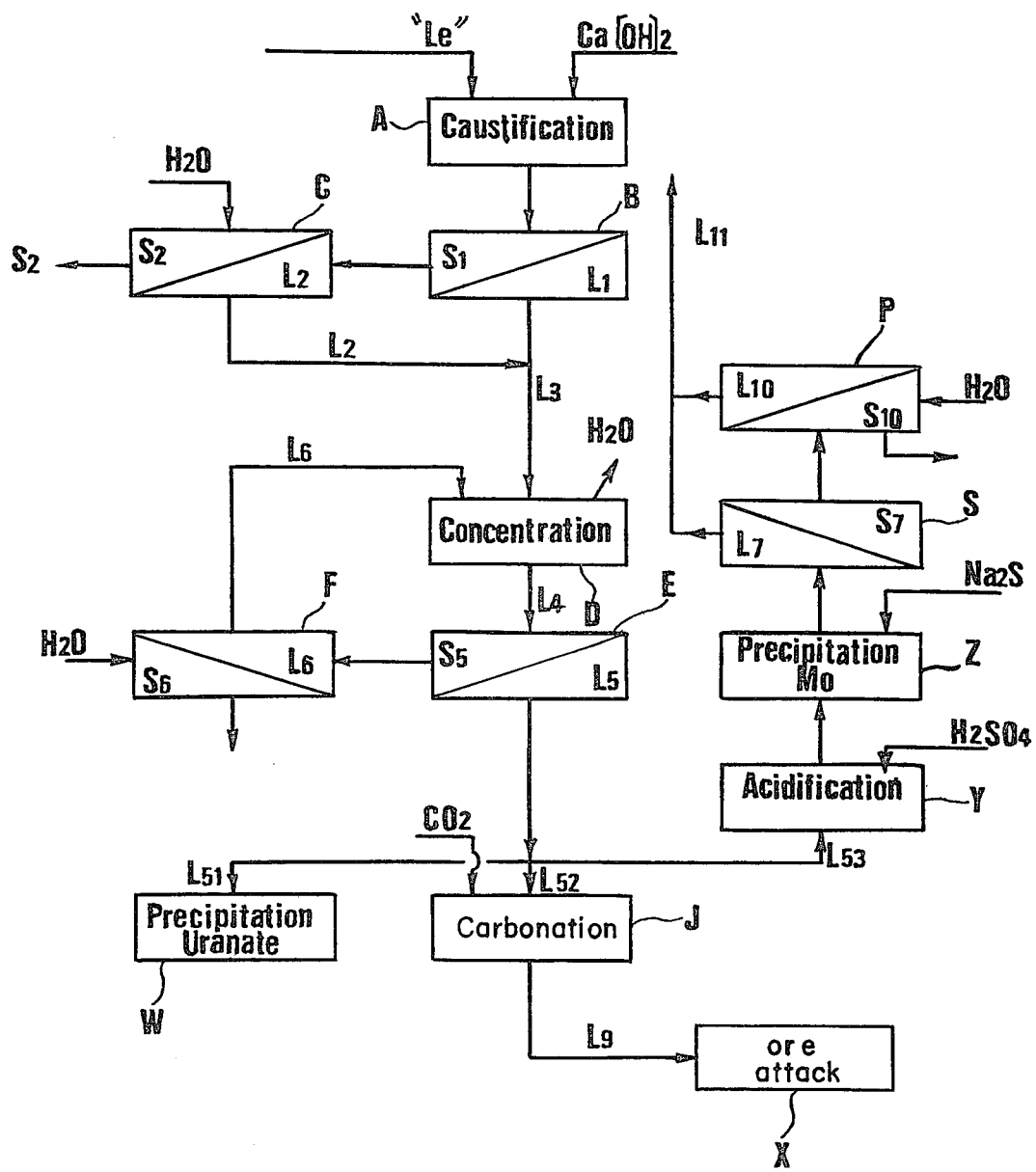

(illustrated in FIG. 4)

A solution with a high residual KOH content, which was drawn off at the end of a uraniferous ore attack cycle, after precipitation and separation of sodium uranate, was treated with the process of the invention. The solution 'Le' was of the following composition by weight:

| | |
|---|---|
| KOH | 22.2 kg |
| $K_2CO_3$ | 46.8 kg |
| $K_2SO_4$ | 36.7 kg |
| Uranium | 0.030 kg |
| Molybdenum | 2.1 kg |
| $H_2O$ + organic materials and various | 1319.5 kg |
| including B.O.D. organic materials | 0.21 kg |

1,427.3 kg of this solution was introduced into A with 32.7 kg of lime representing an excess, for effecting virtually total caustification of the carbonate present, by heating it to and maintaining it at a temperature of 95° C. for a period of about 3 hours.

The resulting slurry was then decanted into B for the operation of separating the solid phase $S_1$ and the liquid phase $L_1$.

The cake $S_1$ was then rinsed in C with 20 kg of water. The mother liquors which impregnated the cake $S_1$ were thus extracted and combined with the liquor $L_1$ resulting from the separation step B.

The cake $S_2$ which weighed 53.5 kg was of the following composition by weight:

| | |
|---|---|
| Uranium | 0.005 kg |
| $CaCO_3$ | 33.9 kg |
| $Ca(OH)_2$ excess | 5.0 kg |
| Impregnation $H_2O$, organic materials & various | 14.6 kg |
| including B.O.D. organic materials | 0.12 kg |

The liquor $L_3$ formed by the mixture of the liquors $L_1$ and $L_2$ represented a weight of 1,426.5 kg and was of the following composition by weight:

| | |
|---|---|
| KOH | 60.2 kg |
| $K_2SO_4$ | 36.7 kg |
| Uranium | 0.025 kg |
| Molybdenum | 2.1 kg |
| Water + organic materials and various | 1327.5 kg |
| including B.O.D. organic materials | 0.09 kg |

It was conducted to D where a concentration step was performed by evaporation of 1,027.5 kg of water.

The slurry issuing from D was decanted into E where a cake $S_5$ and a liquor $L_5$ were separated.

The cake $S_5$ was then subjected to a rinsing operation in F with 15 kg of water, giving a cake $S_6$. The washing liquor $L_6$ was recycled to D, to undergo concentration therein.

The cake $S_6$ represented a weight of 39.9 kg, and was of the following composition by weight:

| | |
|---|---|
| $K_2SO_4$ | 29.7 kg |
| $H_2O$ (impregnation) | 10.2 kg |

The liquor $L_5$ resulting from the separation operation E represented a weight of 374.1 kg and was of the following composition by weight:

| | |
|---|---|
| KOH | 60.2 kg |
| $K_2SO_4$ | 7.0 kg |
| Uranium | 0.025 kg |
| Molybdenum | 2.1 kg |
| $H_2O$ + organic materials + various | 304.8 kg |
| including organic materials | 0.09 kg |

Upon issuing from E, the liquor $L_5$ was divided into three portions $L_{51}$, $L_{52}$ and $L_{53}$.

The liquor $L_{51}$ representing a weight of 231.9 kg was directly recycled to W for precipitation of sodium uranate.

The liquor $L_{52}$ representing a weight of 105.3 kg was introduced into J to undergo therein carbonation by the absorption of 6.7 kg of $CO_2$. The liquor $L_9$ resulting from the carbonation step in E was in actual fact a slurry having the following composition by weight:

| | |
|---|---|
| $K_2CO_3$ | 20.88 kg |
| $K_2SO_4$ | 1.97 kg |
| Molybdenum | 0.59 kg |
| Uranium | 0.007 kg |
| $H_2O$ + organic materials + various | 88.52 kg |
| including B.O.D. organic materials | 0.025 kg |

The slurry $L_9$ was then recycled to X for the uraniferous ore attack.

The liquor $L_{53}$ which represented a mass of 36.90 kg was intended to undergo an operation for removing molybdenum. For that purpose, the liquor was introduced in to Y where it was subjected to acidification by the introduction of 20.25 kg of a 25% $H_2SO_4$ solution, and was then placed in Z where a treatment was effected to cause the precipitation of molybdenum sulphide, by the addition of 10.86 kg of an aqueous solution containing 0.76 kg of $Na_2S$, over a period of 1 hour, at a temperature of 80° C. The slurry issuing from Z was introduced into S for separation therein of the solid phase $S_7$ and the liquid phase $L_7$.

The solid phase $S_7$ which essentially comprised molybdenum sulphide was rinsed in P with 0.5 kg of water, then the solid $S_{10}$ was extracted from P and the liquor $L_{10}$ was combined with the liquor $L_7$ to form the liquor $L_{11}$ which was returned to the caustification step A.

The liquor $L_{11}$ represented a mass of 66.70 kg and contained only 0.003 kg of molybdenum.

EXAMPLE 4

Figure 5:
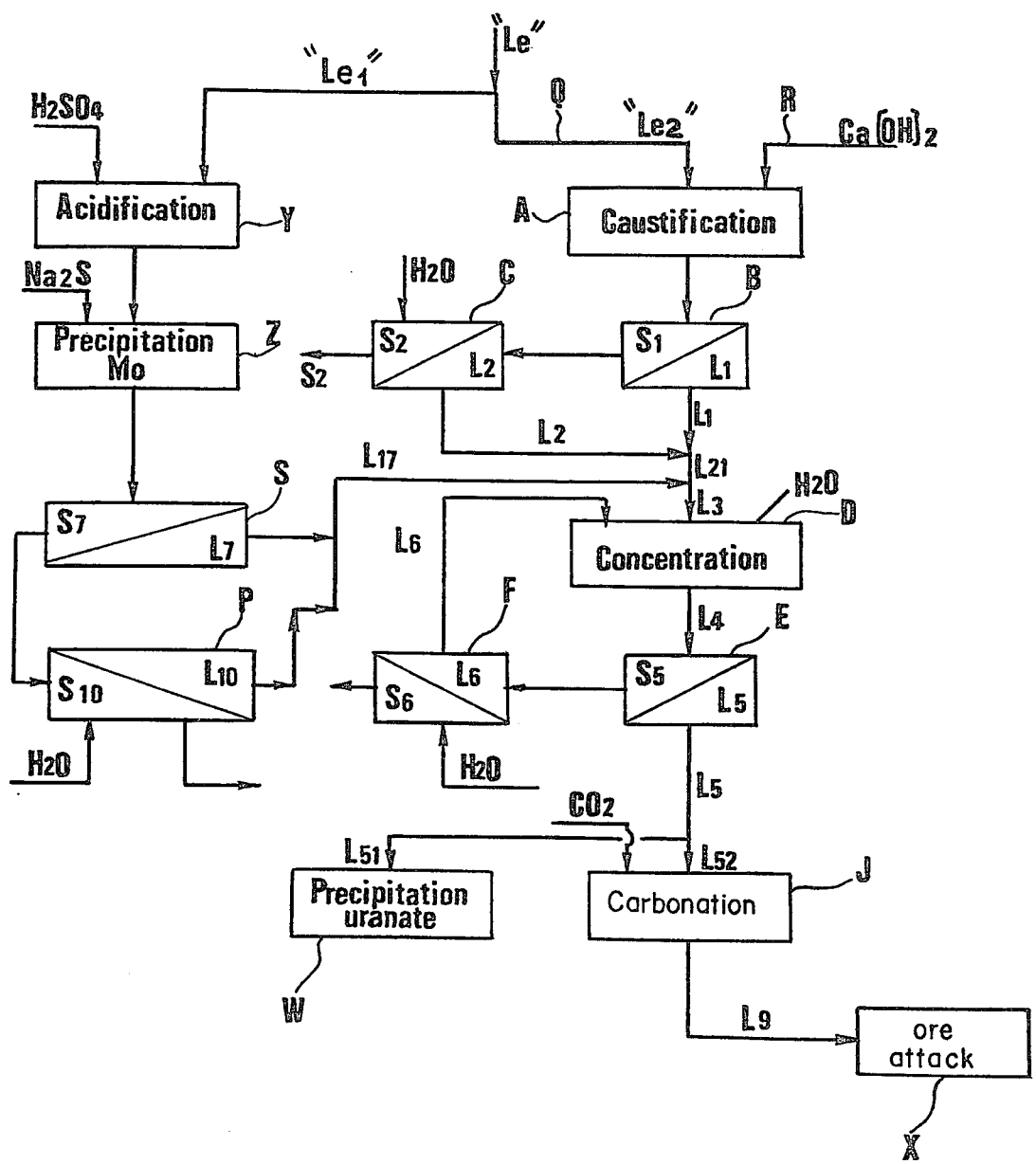
FIG. 5 relates to the treatment according to the invention of solutions containing sodium carbonates, sulphates and hydroxides and other inorganic and/or organic impurities, during which treatment molybdenum is removed from an aliquot fraction of said solutions before the solutions are caustified.

(illustrated in FIG. 5)

A solution with a high residual NaOH content, which was drawn off at the end of a uraniferous ore attack cycle, after precipitation and separation of sodium uranate, was treated by the process of the invention. The solution 'Le' representing 845 kg was of the following composition by weight:

| | |
|---|---|
| NaOH | 8.99 kg |
| $Na_2CO_3$ | 30.16 kg |
| $Na_2SO_4$ | 27.01 kg |
| Uranium | 0.0146 kg |
| Molybdenum | 3.54 kg |
| $H_2O$ + organic materials and various | 775.3 kg |
| including B.O.D. organic materials | 0.169 kg |

The molybdenum removal treatment was carried out on the aliquot fraction '$Le_1$' of the initial solution 'Le', while the fraction '$Le_2$' was intended to be subjected to caustification.

The solution '$Le_1$' representing a mass of 33.7 kg and originating from the solution 'Le' which has not yet been caustified was introduced into Y where it was subjected to acidification by the addition of 3.8 kg of a 50% $H_2SO_4$ solution, and was then placed in Z where a treatment was performed by the addition of 5.10 kg of an 8.8% $Na_2S$ solution at a temperature of 80° C. and over a period of 1 hour, causing precipitation of molybdenum sulphide. The slurry issuing from Z was introduced into S where the solid phase $S_7$ and the liquid phase $L_7$ were separated.

The solid phase $S_7$ was rinsed in P with 0.5 kg of water, then the solid $S_{10}$ was extracted therefrom, together with the liquor $L_{10}$ which, combined with the liquor $L_7$, formed the liquor $L_{17}$ which is returned after the causification step A.

The liquor $L_{17}$ represented a mass of 41.10 kg and was of the following composition by weight:

| | |
|---|---|
| $Na_2SO_4$ | 3.70 kg |
| Uranium | 0.0006 kg |
| Molybdenum | 0.014 kg |
| Water + organic materials + various | 775.3 kg |
| including B.O.D. organic materials | 0.007 kg |

The liquor $L_{17}$ contained only 0.014 kg of molybdenum after this treatment.

The solution 'Le$_2$' representing a mass of 811.3 kg and originating from the solution 'Le' which has not yet been caustified was introduced into A with 27.3 kg of lime, for effecting causification of the carbonate present, by heating to and holding at a temperature of 95° C. for a period of approximately 3 hours.

The resulting slurry was then decanted into B where the solid phase S$_1$ and the liquid phase L$_1$ were separated.

The cake S$_1$ was then washed in C with 18.1 kg of water. The mother liquors which impregnated the cake S$_1$ were thus extracted and combined with the liquor L$_1$ resulting from the separation step B.

The liquors L$_1$ and L$_2$ formed the liquor L$_{21}$ to which the liquor L$_{17}$ resulting from the molybdenum removal treatment was added.

The cake S$_2$ issuing from C had a weight of 41.8 kg and was of the following composition by weight:

| | |
|---|---|
| CaCO$_3$ | 27.32 kg |
| Ca(OH)$_2$ excess | 4.85 kg |
| Uranium | 0.001 kg |
| Impregnation H$_2$O + organic materials and various | 9.63 kg |
| including B.O.D. organic materials | 0.10 kg |

The liquor L$_3$ formed by the mixture of liquors L$_{21}$ and L$_{17}$ referred to above represented a weight of 856.0 kg and was of the following composition by weight:

| | |
|---|---|
| NaOH | 30.49 kg |
| Na$_2$SO$_4$ | 29.63 kg |
| Uranium | 0.013 kg |
| Molybdenum | 3.414 kg |
| Water + organic materials & various | 792.49 kg |
| including B.O.D. organic materials | 0.069 kg |

It was passed into D where a concentration step was performed by evaporation of 710 kg of water.

The slurry issuing from D was decanted into E where a cake S$_5$ and a liquor L$_5$ were separated.

The cake S$_5$ was then subjected to a washing operation in F with 6.2 kg of water, giving a cake S$_6$. The washing liquor L$_6$ was recycled to D, to undergo concentration therein.

The cake S$_6$ represented a weight of 30.3 kg and was of the following composition by weight:

| | |
|---|---|
| Na$_2$SO$_4$ | 27.8 kg |
| H$_2$O and various | 2.5 kg |

The liquor L$_5$ resulting from the separation step in E represented a weight of 121.9 kg and was of the following composition by weight:

| | |
|---|---|
| NaOH | 30.49 kg |
| Na$_2$SO$_4$ | 1.83 kg |
| Uranium | 0.013 kg |
| Molybdenum | 3.414 kg |
| H$_2$O + organic materials + various | 86.153 kg |
| including B.O.D. organic materials | 0.069 kg |

Upon issuing from E, the liquor L$_5$ was divided into two fractions L$_{51}$ and L$_{52}$.

The liquor L$_{51}$ representing a weight of 79.4 kg was directly recycled to W for precipitation of sodium uranate.

The liquor L$_{52}$ representing a weight of 42.50 kg was introduced into J in order to undergo carbonation therein, by the absorption of 5.85 kg of CO$_2$.

The liquor L$_9$ resulting from the carbonation step E was in actual fact a slurry representing a weight of 48.35 kg and having the following composition by weight:

| | |
|---|---|
| Na$_2$CO$_3$ | 14.1 kg |
| Na$_2$SO$_4$ | 0.64 kg |
| Uranium | 0.005 kg |
| Molybdenum | 1.194 kg |
| H$_2$O + organic materials + various | 32.41 kg |
| including B.O.D. organic materials | 0.029 kg |

The slurry L$_9$ was then recycled to X for the uraniferous ore attack.

EXAMPLE 5

(illustrated in FIG. 5)

A solution with a higher residual NaOH content than the solution treated in Example 4 and which was drawn off at the end of a uraniferous ore attack cycle after precipitation and separation of sodium uranate, was treated by the process according to the invention. The solution 'Le' representing 724.4 kg was of the following composition by weight:

| | |
|---|---|
| NaOH | 29.1 kg |
| Na$_2$CO$_3$ | 76.85 kg |
| Na$_2$SO$_4$ | 32.4 kg |
| Uranium | 0.015 kg |
| Molybdenum | 9.02 kg |
| H$_2$O + organic materials + various | 577.02 kg |
| including B.O.D. organic materials | 0.233 kg |

The molybdenum removal treatment was performed on the aliquot fraction 'Le$_1$' of the initial solution 'Le', while the fraction 'Le$_2$' was intended to undergo caustification.

The solution 'Le$_1$' representing a mass of 8.70 kg and resulting from the solution 'Le' which has not yet been caustified was introduced into Y where it was subjected to acidification by the addition of 2.56 kg of a 50% H$_2$SO$_4$ solution, and was then placed in Z where a treatment was effected by the addition of 3.88 kg of an 8.5% Na$_2$S solution at a temperature of 80° C. and over a period of 1 hour, causing precipitation of molybdenum sulphide. The slurry issuing from Z was introduced into S where separation of the solid phase S$_7$ and the liquid phase L$_7$ was effected.

The liquid phase S$_7$ was rinsed in P with 0.6 kg of water, then the solid S$_{10}$ was extracted therefrom, together with the liquor L$_{10}$ which, combined with the liquor L$_7$, formed the liquor L$_{17}$ which was returned after the causification step A.

The liquor L$_{17}$ represented a weight of 14.76 kg and was of the following composition by weight:

| | |
|---|---|
| Na$_2$SO$_4$ | 2.43 kg |
| Uranium | 0.0 kg |
| Molybdenum | 0.014 kg |
| H$_2$O + organic materials + various | 12.316 kg |
| including B.O.D. organic materials | 0.003 kg |

The liquor L$_{17}$ contained only 0.014 kg of molybdenum after this treatment.

The solution 'Le$_2$' representing a weight of 715.7 kg and resulting from the as yet uncaustified solution 'Le' was introduced into A with 63.61 kg of lime, for effecting caustification of the carbonate present, by heating to and holding at a temperature of 95° C. for a period of time of about 3 hours.

The resulting slurry was then decanted into B where the solid phase S$_1$ and the liquid phase L$_1$ were separated.

The cake S$_1$ was then washed in C with 47 kg of water. The mother liquors which impregnated the cake S$_1$ were thus extracted and combined with the liquor L$_1$ resulting from the separation step B.

The liquors L$_1$ and L$_2$ formed the liquor L$_{21}$ to which was added the liquor L$_{17}$ resulting from the molybdenum removal treatment.

The cake S$_2$ issuing from C weighed 100.52 kg and was of the following composition by weight:

| | |
|---|---|
| CaCO$_3$ | 64.43 kg |
| Ca(OH)$_2$ excess | 10.84 kg |
| Uranium | 0.004 kg |
| Impregnation H$_2$O + organic materials + various | 25.25 kg |
| Including B.O.D. organic materials | 0.14 kg |

The liquor L$_3$ formed by the mixture of liquors L$_{21}$ and L$_{17}$ referred to above represented a weight of 740.55 kg, and was of the following composition by weight:

| | |
|---|---|
| NaOH | 80.3 kg |
| Na$_2$CO$_3$ | 7.63 kg |
| Na$_2$SO$_4$ | 34.44 kg |
| Uranium | 0.011 kg |
| Molybdenum | 8.926 kg |
| Water + organic materials + various | 609.246 kg |
| Including B.O.D. organic materials | 0.093 kg |

It was passed into D where a concentration operation was effected by evaporation of 394.55 kg of water.

The slurry issuing from D was decanted into E where a cake S$_5$ and a liquor L$_5$ were separated.

The cake S$_5$ was then subjected to a washing operation in F with 6.6 kg of water, giving a cake S$_6$. The washing liquor L$_6$ was recycled to D, to undergo concentration therein.

The cake S$_6$ represented a weight of 33.8 kg and was of the following composition by weight:

| | |
|---|---|
| Na$_2$CO$_3$ | 1.25 kg |
| Na$_2$SO$_4$ | 29.66 kg |
| H$_2$O and various | 2.89 kg |

The liquor L$_5$ resulting from the separation step in E represented a weight of 318.8 kg and was of the following composition by weight:

| | |
|---|---|
| NaOH | 80.3 kg |
| Na$_2$CO$_3$ | 6.38 kg |
| Na$_2$SO$_4$ | 4.78 kg |
| Uranium | 0.011 kg |
| Molybdenum | 8.926 kg |
| H$_2$O + organic materials + various | 218.403 kg |
| Including B.O.D. organic materials | 0.093 kg |

Upon issuing from E, the liquor L$_5$ was divided into two fractions L$_{51}$ and L$_{52}$.

The liquor L$_{51}$, representing a weight of 205.7 kg, was directly recycled to W for precipitation of sodium uranate.

The liquor L$_{52}$ representing a weight of 113.1 kg was introduced into J, to be subjected therein to carbonation by absorption of 15.67 kg of CO$_2$.

The liquor L$_9$ resulting from the carbonation step E was in actual fact a slurry representing a mass of 128.77 kg having the following composition by weight:

| | |
|---|---|
| Na$_2$CO$_3$ | 40.1 kg |
| Na$_2$SO$_4$ | 1.70 kg |
| Uranium | 0.004 kg |
| Molybdenum | 3.166 kg |
| H$_2$O + organic materials + various | 83.89 kg |
| Including B.O.D. organic materials | 0.033 kg |

This slurry L$_9$ was then recycled to X for the uraniferous ore attack.

I claim:

1. A process for the purification of an aqueous solution wherein said aqueous solution initially contains (1) a sulphate, a carbonate and a hydroxide or hydrogen carbonate of one of the alkali metals sodium or potassium, and (2) at least one of the metals selected from the group consisting of vanadium, uranium and molybdenum in the form of sodium or potassium salts, and (3) inorganic and/or organic impurities, said process comprising the steps of:

(a) reacting at a temperature up to the boiling point temperature of said aqueous solution containing the metal salts with lime added to the solution in an amount within the range of 0.1 to 20 times the stoichiometric amount required to convert any carbonates to hydroxides plus the amount taken up in the precipitation of insoluble compounds of calcium to form a precipitate of calcium carbonate and other insoluble organic and inorganic calcium salts in a hydroxide-enriched liquor;

(b) separating the precipitate from the hydroxide-enriched liquor;

(c) washing the separated precipitate to form a wash liquor;

(d) mixing said wash liquor and said hydroxide-enriched liquor;

(e) concentrating the hydroxide-enriched liquor and wash liquor mixture to a hydroxide content which does not exceed 50% by weight to precipitate alkali metal sulphate, leaving a mother liquor; and (f) separating the alkali metal sulphate precipitate from the mother liquor.

2. A process as claimed in claim 1 which includes the steps of:

(g) washing the precipitate separated in step (f), and (h) recycling the wash liquor from step (g) to the concentration step (e).

3. A process as claimed in claim 2 in which the precipitate is washed in step (g) with water.

4. A process as claimed in claim 2 in which the precipitate is washed in step (g) with an aqueous solution of water saturated with a sodium or potassium sulphate.

5. A process as claimed in claim 1 in which the lime is added in an amount equal to the stoichiometric amount for total conversion of the carbonate in the solution to hydroxide.

6. A process as claimed in claim 1 in which the lime is added in an amount less than the stoichiometric amount for conversion of all of the carbonates in solution to hydroxide.

7. The process of claim 1 wherein one of the metals is molybdenum.

8. A process as claimed in claim 7 which includes the steps of:
(i) acidifying a portion of the hydroxide-rich liquor separated in step (b), and
(j) adding an alkaline sulphide or hydrogen sulfide to precipitate a molybdenum compound.

9. A process as claimed in claim 7 which includes the step of:
(k) acidifying a portion of the original solution before the addition of lime in step (a) and adding an alkaline sulphide or hydrogen sulfide to precipitate a molybdenum compound.

10. A process as claimed in claims 8 or 9 in which the addition of the alkaline sulphide or hydrogen sulfide is carried out before or at the same time as the acidification step.

11. A process as claimed in claim 1 which includes the step of:
(l) adding a barium compound to the mother liquor separated in step (f) in an amount at least equal to the stoichiometric amount for precipitation of insoluble organo barium compounds.

12. A process as claimed in claim 1 which includes the step of:
(m) treating the mother liquor separated in step (f) with sodium or potassium dioxide or hydrogen peroxide to degrade organic material present in the mother liquor.

13. A process as claimed in claim 1 which includes the step of:
(n) contacting the mother liquor separated in step (f) with activated carbon.

14. A process as claimed in claim 1 which includes the step of:
(o) carbonating the mother liquor separated in step (f) by treatment with carbon dioxide gas.

15. A process as claimed in claim 1 which includes the step of:
(p) treating the hydroxide enriched liquor from step (b) for removing the molybdenum and the organic material.

16. A process as claimed in claim 1 in which step (a) is carried out at a temperature within the range of 20°–100° C.

17. A process as claimed in claim 1 in which step (a) is carried out at a temperature within the range of 50°–97° C.

18. A process as claimed in claim 1 in which the concentration of step (b) is carried out to a hydroxide content that does not exceed 25%.

* * * * *